United States Patent [19]

Huffman

[11] Patent Number: 5,493,523
[45] Date of Patent: Feb. 20, 1996

[54] MECHANISM AND METHOD FOR INTEGER DIVIDE INVOLVING PRE-ALIGNMENT OF THE DIVISOR RELATIVE TO THE DIVIDEND

[75] Inventor: William A. Huffman, Los Gatos, Calif.

[73] Assignee: Silicon Graphics, Inc., Mountain View, Calif.

[21] Appl. No.: 167,006

[22] Filed: Dec. 15, 1993

[51] Int. Cl.$^6$ .................................................. G06F 7/52
[52] U.S. Cl. ............................................................ 364/766
[58] Field of Search ................................. 364/764, 766

[56] References Cited

U.S. PATENT DOCUMENTS

| | | | |
|---|---|---|---|
| 5,007,009 | 4/1991 | Azetsu | 364/764 |
| 5,014,233 | 5/1991 | Kihava et al. | 364/766 |
| 5,097,435 | 3/1992 | Takahashi | 364/766 |
| 5,297,073 | 3/1994 | Davidian | 364/766 |
| 5,317,531 | 5/1994 | Zaidi | 364/766 |

*Primary Examiner*—Tan V. Mai
*Attorney, Agent, or Firm*—Sterne, Kessler, Goldstein & Fox

[57] ABSTRACT

A mechanism for dividing an integer dividend by an integer divisor to generate an integer quotient operates by aligning the divisor relative to the dividend such that a right-most bit of the divisor is aligned with a bit M of the dividend. The divisor is compared to an integer value whose right-most bits are equal to bits of the dividend which are aligned with bits of the divisor. As a result of this comparison, quotient bits which positionally correspond to the dividend bit M and to bits of the dividend which are located to the left of the dividend bit M are cleared to zero. Also as a result of the comparison, the dividend is divided by the divisor as aligned relative to the dividend to thereby generate values for any uncleared quotient bits.

16 Claims, 7 Drawing Sheets

MECHANISM AND METHOD FOR INTEGER DIVIDE INVOLVING PRE-ALIGNMENT OF THE DIVISOR RELATIVE TO THE DIVIDEND

CROSS-REFERENCE TO RELATED APPLICATIONS

The following applications of common assignee contain some common disclosure, and are believed to have effective filing dates identical with that of the present application:

U.S. patent application entitled "Split Level Cache", Ser. No. 08/168,832, currently pending.

U.S. patent application entitled "Superscalar Microprocessor Instruction Pipeline Including Instruction Dispatching and Kill Control", Ser. No. 08/168,094, currently pending.

U.S. patent application entitled "Conflict Resolution In Interleaved Memory Systems With Multiple Parallel Accesses", Ser. No. 08/487,240, currently pending, which is a continuation of U.S. patent application entitled "Conflict Resolution In Interleaved Memory System With Multiple Parallel Accesses", Ser. No. 08/168,827, now abandoned.

U.S. patent application entitled "Apparatus for Processing Instructions in a Computing System", Ser. No. 08/168,744 currently pending.

U.S. patent application entitled "Variable Page Size Translation Lookaside Buffer", Ser. No. 08/168,822, currently pending.

U.S. patent application entitled "System and Method for Coherency in a Split-Level Data Cache System", Ser. No. 08/167,005, currently pending.

U.S. patent application entitled "Load Latency of Zero for Floating Point Load Instructions Using a Load Data Queue", Ser. No. 08/412,212, currently pending, which is a continuation of U.S. patent application entitled "Load Latency of Zero for Floating Point Load Instructions Using a Load Data Queue, Ser. No. 08/167,004, now abandoned.

U.S. patent application entitled "Debug Mode for a Superscalar RISC Processor", Ser. No. 08/166,969, currently pending.

BACKGROUND OF THE INVENTION

1. Field of the Invention

The present invention relates to a mechanism and method for performing integer divide in a computer system.

2. Related Art

Most computer systems include a mechanism for performing an integer divide operation wherein an integer dividend is divided by an integer divisor. Conventional integer divide mechanisms operate by iteratively performing shift and subtraction operations on the dividend and the divisor. Such conventional integer divide mechanisms are described in many publicly available documents, such as John L. Hennessy and David A. Patterson, *Computer Architecture - A Quantitative Approach*, (Morgan Kaufmann Publishers, Inc., San Mateo, Calif., U.S.A., 1990), which is herein incorporated by reference in its entirety.

As will be appreciated, shift and subtraction operations are time consuming and computationally expensive. Consequently, integer divide operations as performed by conventional integer divide mechanisms are time consuming and computationally expensive since they involve the iterative performance of shift and subtraction operations on the dividend and the divisor.

Thus, what is required is a more efficient integer divide mechanism and method.

SUMMARY OF THE INVENTION

The present invention is directed to a mechanism and a method of dividing an integer dividend by an integer divisor to generate an integer quotient. The mechanism of the present invention operates by aligning the divisor relative to the dividend such that a right-most bit of the divisor is aligned with a bit M of the dividend. M is a positive integer value that identifies a bit position of the dividend. The divisor is compared to an integer value whose right-most bits are equal to bits of the dividend which are aligned with bits of the divisor.

As a result of this comparison, quotient bits which positionally correspond to the dividend bit M and to bits of the dividend which are located to the left of the dividend bit M are cleared to zero. Also as a result of the comparison, the dividend is divided by the divisor as previously aligned relative to the dividend to thereby generate values for any uncleared quotient bits.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE FIGURES

The present invention will be described with reference to the accompanying drawings, wherein.

DETAILED DESCRIPTION OF THE PREFERRED EMBODIMENTS

The present invention is directed to an integer divide mechanism which is not time consuming or computationally expensive when compared to conventional integer divide mechanisms and methods. The advantages of the present invention are particularly apparent when the quotient of the integer divide operation is short (that is, where the number of leading zeros in the quotient is great relative to the total number of bits of the quotient) or, equivalently, where the dividend is short (this is described below). The present invention is adapted for use with any data processing device requiring the capability of performing integer divide operations. For example, the present invention is adapted for use with computer processors having a RISC (reduced instruction set computer) architecture. The following references discuss such computer processors: G. Kane and J. Heinrich, *MIPS RISC Architecture* (Prentice Hall, Englewood Cliffs, N.J., U.S.A., 1992); Mike Johnson, *Superscalar Microprocessor Design* (Prentice Hall, Englewood Cliffs, N.J., U.S.A., 1991); and Stephen B. Furber, *VLSI RISC Architecture and Organization* (Marcel Dekker, Inc., New York, N.Y., U.S.A., 1989), all of which are incorporated herein by reference.

The integer divide mechanism of the present invention can be used to perform both unsigned integer division and signed integer division. For simplicity, however, the present invention shall first be described with respect to unsigned integer division. Signed integer division is considered after the discussion of unsigned integer division.

Figure 4A:
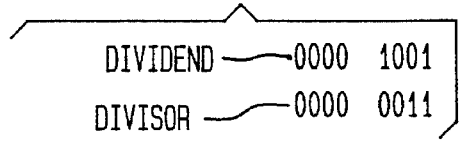
FIGS. 4A–4L depict the processing of a second example integer divide operation and is used to illustrate the features of the present invention.
Figure 5:
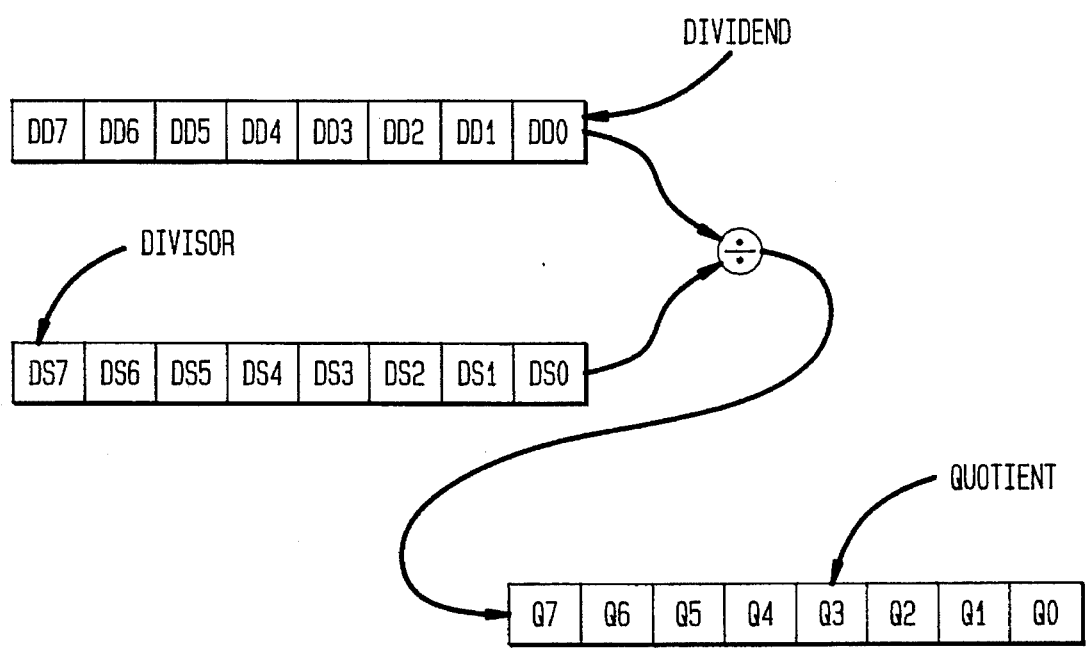
FIG. 5 diagrammatically illustrates an integer divide operation.

Before describing the present invention in detail, it will be useful to consider how the following integer divide operation is performed by a conventional integer divide mechanism: 9/3 (conventional integer divide mechanisms are described in many publicly available documents, such as *Computer Architecture A Quantitative Approach* by Hennessy and Patterson, cited above). The binary representations of 9 (the dividend) and 3 (the divisor) are shown in FIG. 4A. For reference purposes, the bits of the dividend are represented by DD0, DD1, ..., DD7 (DD0 being the right-most bit or the least significant bit and DD7 being the left-most bit or the most significant bit), the bits of the divisor are represented by DS0, DS1, ..., DS7 (DS0 being the right-most bit and DS7 being the left-most bit), and the bits of the quotient are represented by Q0, Q1, ..., Q7 (Q0 being the right-most bit and Q7 being the left-most bit). See FIG. 5.

Figure 4B:
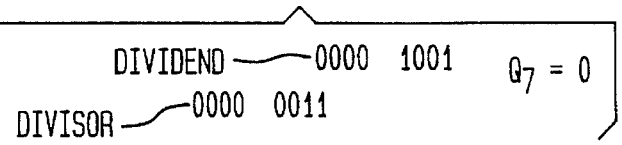

A conventional integer divide mechanism conceptually operates by aligning the right-most bit DS0 of the divisor with the left-most bit DD7 of the dividend (see FIG. 4B), and then subtracting the divisor from an integer value whose right-most bits are equal to the bits of the dividend which are aligned with the divisor (in this case, bit DD7). Thus, 3 (the divisor) is subtracted from 0 (the integer value whose right-most bits correspond to the bit DD7 of the dividend which is aligned with the divisor), and the result is −3. If the result of the subtraction is negative, then quotient bit Q7 is set to zero. If the result of the subtraction is positive (including zero), then the quotient bit Q7 is set to one. Here, the quotient bit Q7 is set to zero.

Figure 4C:
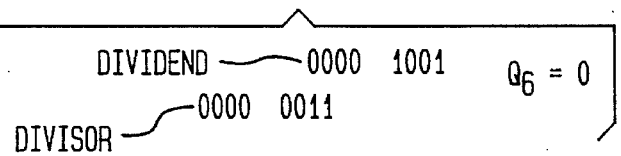
Figure 4D:
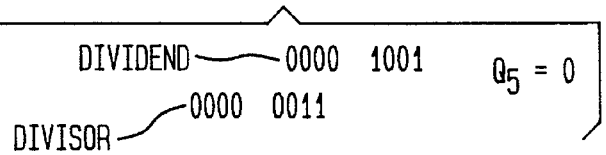
Figure 4E:
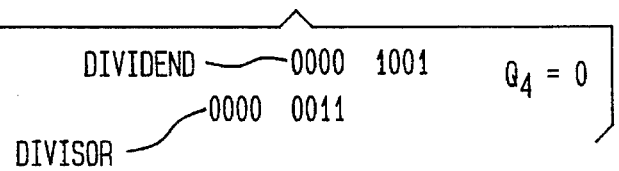
Figure 4F:
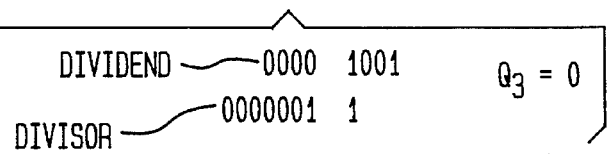
Figure 4G:
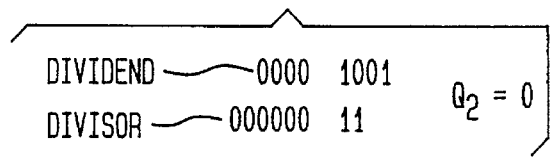

Next, the divisor is shifted right by one bit (see FIG. 4C). Then, the divisor is subtracted from an integer value whose right-most bits are equal to the bits of the dividend which are aligned with the divisor (in this case, bits DD7 and DD6). Thus, 3 (the divisor) is subtracted from 0 (the integer value whose right-most bits correspond to the bits DD7 and DD6 of the dividend which are aligned with the divisor), and the result is −3. If the result of the subtraction is negative, then quotient bit Q6 is set to zero. Otherwise, it is set to one. Here, the quotient bit Q6 is set to zero.

In a similar manner, quotient bits Q5-Q2 are set to zero (see FIGS. 4D–4G, respectively).

Figure 4H:
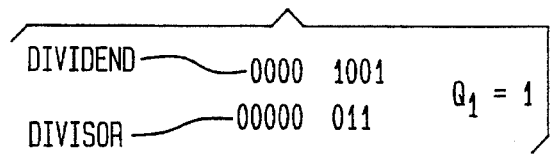
Figure 4I:
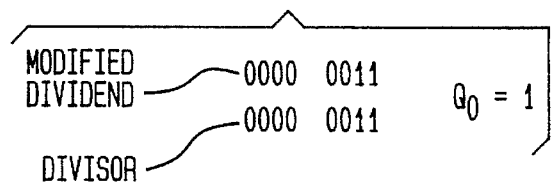

After quotient bit Q2 is set to zero, the divisor is shifted right by one bit (see FIG. 4H) and is subtracted from an integer value whose right-most bits are equal to the bits of the dividend which are aligned with the divisor (in this case, bits DD7-DD1). Thus, 3 (the divisor) is subtracted from 4 (the integer value whose right-most bits correspond to the bits DD7-DD1 of the dividend which are aligned with the divisor), and the result is 1. Since the result is positive, quotient bit Q1 is set to one. Also, the dividend is modified to reflect this subtraction operation, as shown in FIG. 4I.

Then, the divisor is shifted right by one bit (see FIG. 4I) and is subtracted from an integer value having as its right-most bits those bits of the modified dividend which are aligned with the divisor (in this case, bits DD7-DD0). Thus, 3 (the divisor) is subtracted from 3 (the integer value whose right-most bits correspond to the bits DD7-DD0 of the dividend which are aligned with the divisor), and the result is 0. Since the result is positive, quotient bit Q0 is set to one. The integer divide operation is then complete since the right-most bit DS0 of the divisor is aligned with the right-most bit DD0 of the dividend.

Note that the quotient bits corresponding to all leading zeros of the dividend are set equal to zero during the operation of the conventional integer divide mechanism. This is always the case in unsigned integer division, since a non-zero divisor is being subtracted from zero.

Thus, as identified by the inventors, it is possible that a great number of shift and subtraction operations can be eliminated during integer divide operations by clearing (that is, setting to zero) the quotient bits that positionally correspond to leading zeros in the dividend (that is, which have the same bit positions as the dividend leading zero bits), and by beginning the conventional integer divide process (as described above) with the right-most bit DS0 of the divisor aligned with the left-most bit of the dividend that is equal to one (this is also called the leading non-zero dividend bit).

The inventors have identified that, by eliminating shift and subtraction operations, the performance of integer divide operations becomes less time consuming and less computationally expensive. The actual performance savings depends on the particular values of the dividend, divisor, and quotient. Generally, greater performance savings will be achieved when the quotient is short (that is, where the number of leading zeros in the quotient is great relative to the total number of bits of the quotient) or, equivalently, where the dividend is short.

According to a first embodiment of the present invention, integer division is performed by scanning the dividend from left to right to locate the first non-zero dividend bit (that is, to locate the leading non-zero bit of the dividend). The right-most bit DS0 of the divisor is then pre-aligned with this bit of the dividend, and the quotient bits corresponding to the dividend bits to the left of the leading non-zero dividend bit are set equal to zero. Then, the conventional integer division process begins (as discussed above with reference to FIGS. 4A–4I) with the divisor pre-aligned relative to the dividend and the appropriate number of leading zeros stored in the quotient as just described.

Figure 4J:
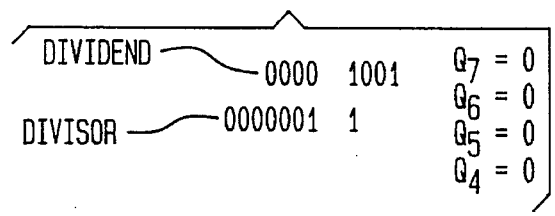

The operation of the first embodiment of the present invention is illustrated in FIG. 4J, where the leading non-zero dividend bit is DD3. The right-most bit DS0 of the divisor is pre-aligned with dividend bit DD3, and quotient bits Q7-Q4 corresponding to the dividend bits DD7-DD4 to the left of the leading non-zero dividend bit DD3 are set equal to zero.

Figure 6:
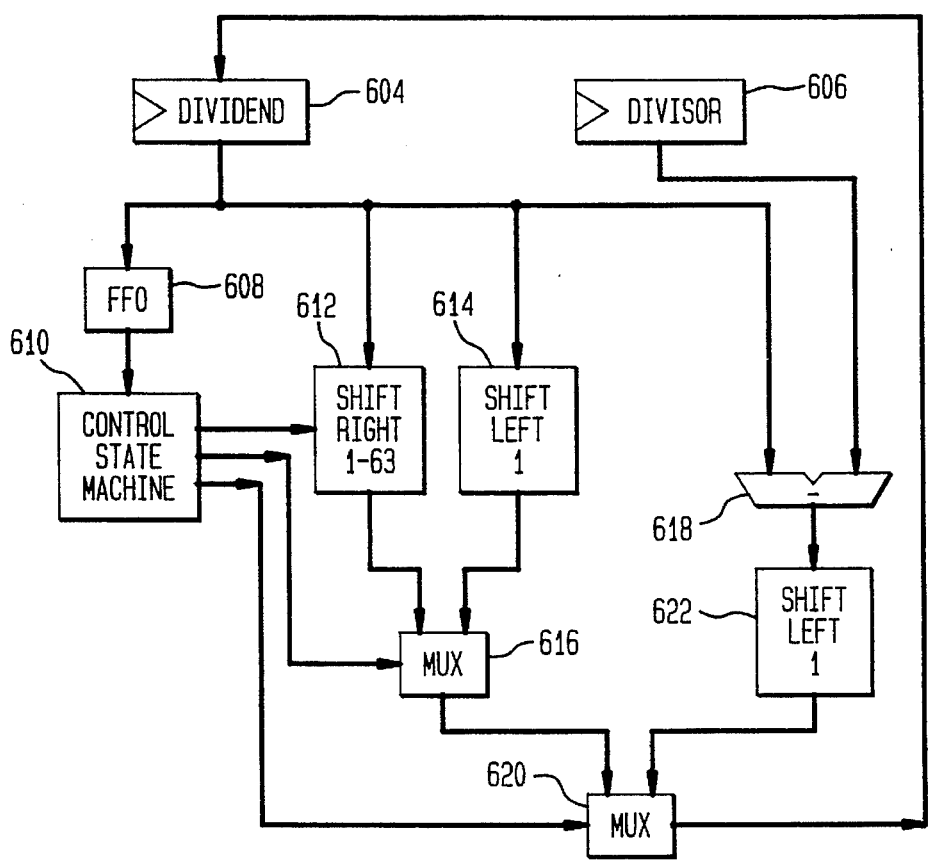
FIG. 6 is a block diagram of an integer divider according to a first embodiment of the present invention.

The first embodiment of the present invention is preferably implemented as shown in FIG. 6, wherein a block diagram of an integer divider 602 is shown. The integer divider 602 includes registers 604 and 606 for storing a dividend and a divisor, respectively.

A find first one (FFO circuit) circuit 608 scans from left to right the dividend from register 604 to locate the leading non-zero dividend bit. A bit position W of the leading non-zero dividend bit is then provided to a control state machine 610. In the example of FIG. 4J, W equals 3.

The control state machine 610 commands a full 1-to-63 bit shift right register 612 (that is, a shift right register that can shift an operand by 1 to 63 bits) to logically shift the dividend right by W bit positions (zeros are shifted into the left end bit position of the shift right register 612). The right shifted dividend is then stored in register 604 via multiplexers 616 and 620 (pursuant to appropriate commands from the control state machine).

The bits of the dividend which are shifted out of the shift right register 612 are stored in a temporary register (not shown) that is coupled to the shift right register 612 and to a shift left register 614 and a shift left register 622 (discussed below). In the example of FIG. 4J, bits "001" are stored in this temporary register.

The control state machine 610 also sets to zero quotient bits corresponding to the dividend bits to the left of the dividend bit W (these quotient bits are preferably stored in a register, not shown). In the example of FIG. 4J, quotient bits Q7-Q4 are set to zero.

At this point, the divisor has been pre-aligned with the dividend, and the appropriate number of leading zeros have been stored in the quotient (that is, in the register which stores the quotient). A conventional integer divide operation then begins using the components of FIG. 6.

Specifically, the divisor (from register 606) is subtracted from the current value of the dividend (from register 604) in a subtracter 618. If the control state machine 610 determines that the result is negative, as is the case in the example of FIG. 4J (where 3 is subtracted from 1), then the control state machine 610 sets to zero quotient bit Q3, and commands the shift left register 614 to shift the dividend (from the register 604) left by one bit, wherein the left-most bit of the value in the temporary register is shifted into the right-most position of the shift left register. This left shifted dividend value is stored in the register 604 via multiplexers 616 and 620. In the example of FIG. 4J, the binary value "10" is stored in the register 604 at this point.

The control state machine 610 causes this cycle to be repeated such that quotient bit Q2 is set to zero, and the binary value "100" is stored in the register 604.

This cycle is again repeated pursuant to appropriate commands of the control state machine 610. However, referring to the example of FIG. 4J, this time the subtraction of the divisor (from register 606) from the current value of the dividend (from register 604) in the subtracter 618 yields a positive value "1" (3 is subtracted from 4). Accordingly, the control state machine 610 sets to one quotient bit Q1, and then commands the shift left register 622 to shift the output of the subtracter 618 left by one bit, wherein the left-most bit of the value in the temporary register is shifted into the right-most position of this shifted value. This shifted value, representing the current value of the dividend, is stored in the register 604 via multiplexers 616 and 620. In the example of FIG. 4J, the binary value "11" is stored in the register 604 at this point.

The cycle is repeated once again pursuant to appropriate commands from the control state machine 610. This time the subtraction of the divisor (from register 606) from the current value of the dividend (from register 604) in the subtracter 618 yields a positive value "0". Accordingly, the control state machine 610 sets to one quotient bit Q0. The integer divide operation is then complete.

The control state machine 610 in the integer divider 602 of FIG. 6 is preferably implemented as a hardware state machine operating as described above. Alternatively, the control state machine 610 is a processor operating in accordance with computer software. The FFO 608 is similar to the normalization control of a floating point adder. Its structure and operation will be apparent to persons skilled in the art based on the discussion herein. Other aspects of the components shown in FIG. 6 will be apparent to persons skilled in the art.

According to a second embodiment of the present invention, integer division is performed by scanning the dividend from left to right to locate the first non-zero dividend bit (that is, to locate the leading non-zero bit of the dividend). The divisor is then scanned from left to right to locate the first non-zero divisor bit (that is, to locate the leading non-zero bit of the divisor). The bit position of the leading non-zero divisor bit is subtracted from the bit position of the leading non-zero dividend bit to thereby generate a pre-alignment bit position.

The right-most bit DS0 of the divisor is then pre-aligned with the dividend bit having this pre-alignment bit position (this dividend bit is called the pre-alignment dividend bit for reference purposes), and the quotient bits corresponding to the pre-alignment dividend bit and to the dividend bits to the left of the pre-alignment dividend bit are set equal to zero. Then, the conventional integer division process begins (as discussed above with reference to FIGS. 4A–4I) with the divisor pre-aligned relative to the dividend and the appropriate number of leading zeros stored in the quotient as just described.

Figure 4K:
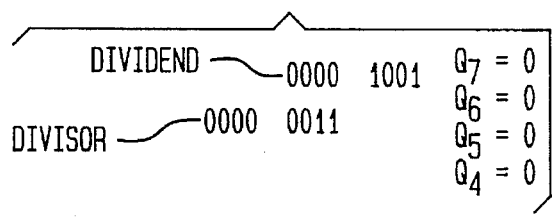
Figure 4L:
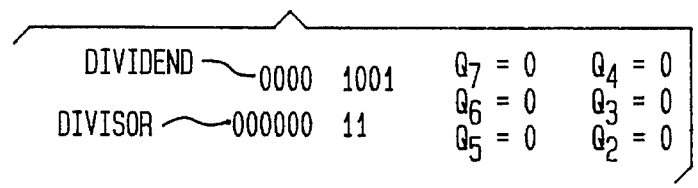

The operation of the second embodiment of the present invention is illustrated in FIG. 4L, where the leading non-zero dividend bit is DD3 and the leading non-zero divisor bit is DS1, such that the pre-alignment bit position is equal to 2. The right-most bit DS0 of the divisor is pre-aligned with dividend bit DD2, and quotient bits Q2 and Q7-Q3 respectively corresponding to the pre-alignment dividend bit DD2 and to the dividend bits DD7-DD3 to the left of the pre-alignment dividend bit DD2 are set equal to zero.

The second embodiment pre-aligns the divisor at the most advantageous position possible relative to the dividend since such alignment of the divisor is based on both the position of the leading non-zero dividend bit and the position of the leading non-zero divisor bit.

Figure 7:
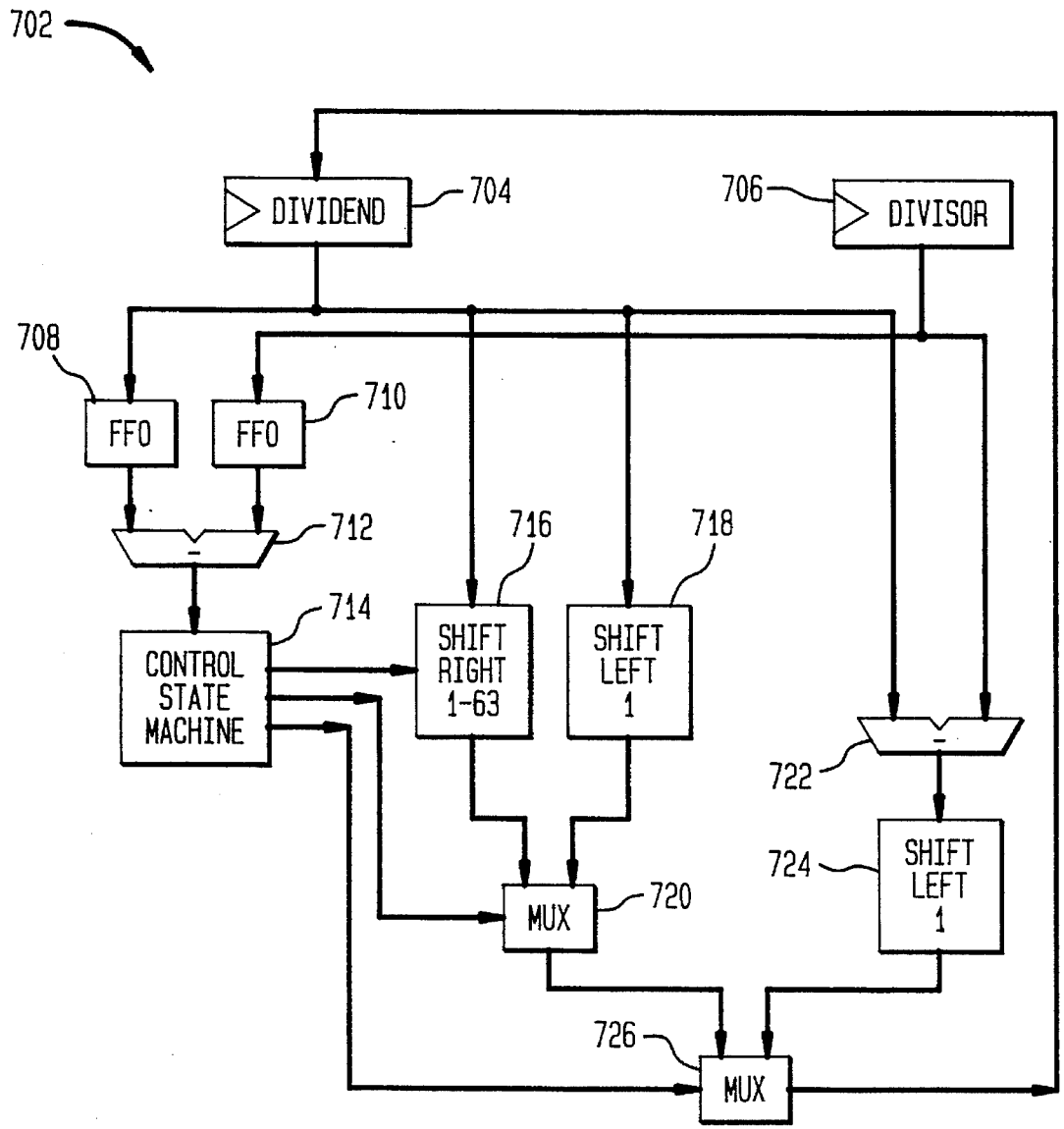
FIG. 7 is a block diagram of an integer divider according to a second embodiment of the present invention.

The second embodiment of the present invention is preferably implemented as shown in FIG. 7, wherein a block diagram of an integer divider 702 is shown. The integer divider 702 includes registers 704 and 706 for storing a dividend and a divisor, respectively.

A first find first one (FFO circuit) circuit 708 scans from left to right the dividend from register 704 to locate the leading non-zero dividend bit. A bit position X of the leading non-zero dividend bit is then provided to a subtracter 712. In the example of FIG. 4L, X equals 3.

A second find first one (FFO circuit) circuit 710 scans from left to right the divisor from register 706 to locate the leading non-zero divisor bit. A bit position Y of the leading non-zero dividend bit is then provided to the subtracter 712. In the example of FIG. 4L, Y equals 1.

The subtracter 712 then generates the pre-alignment bit position (discussed above) by subtracting Y from X. In the example of FIG. 4L, the pre-alignment bit position equals 2. The value of the pre-alignment bit position is transferred to a control state machine 714.

The control state machine 714 commands a full 1-to-63 bit shift right register 716 to logically shift the dividend right by a number of bit positions equal to the value of the pre-alignment bit position. The right shifted dividend is then stored in register 704 via multiplexers 720 and 726 (pursuant to appropriate commands from the control state machine 714).

The bits of the dividend which are shifted out of the shift right register 716 are stored in a temporary register (not shown) that is coupled to the shift right register 716 and to a shift left register 718 and a shift left register 724. In the example of FIG. 4J, bits "01" are stored in this temporary register.

The control state machine 714 also sets to zero quotient bits having bit positions greater than the pre-alignment bit position (these quotient bits are preferably stored in a register, not shown). In the example of FIG. 4J, quotient bits Q7-Q2 are set to zero.

At this point, the divisor has been pre-aligned with the dividend, and the appropriate number of leading zeros have been stored in the quotient (that is, in the register which stores the quotient). A conventional integer divide operation then begins using the components of FIG. 7. This integer divide operation is similar to that described with respect to FIG. 6, and therefore shall not be discussed further.

The control state machine 714 in the integer divider 702 of FIG. 7 is preferably implemented as a hardware state machine operating as described above. Alternatively, the control state machine 714 is a processor operating in accordance with computer software. The FFOs 716 and 718 are similar to the normalization control of a floating point adder. Their structure and operation will be apparent to persons skilled in the art based on the discussion contained herein. Other aspects of the components shown in FIG. 7 will be apparent to persons skilled in the art.

According to a third embodiment of the present invention, integer division is performed by pre-aligning the right-most divisor bit DS0 with a predetermined bit of the dividend. Then, the divisor is subtracted from an integer value whose right-most bits are equal to the bits of the dividend which are aligned with the divisor.

If the result is equal to a negative value, then the quotient bits corresponding to the predetermined dividend bit and the dividend bits to the left of the predetermined dividend bit are set equal to zero, and the conventional integer division procedure begins using the dividend and the pre-aligned divisor. If, instead, the result is equal to a positive value (including zero), then the conventional integer division begins using the dividend and the unaligned divisor. The third embodiment of the present invention is described in greater detail below.

The operation of the third embodiment of the present invention is illustrated in FIG. 4K, where DD4 represents the predetermined bit of the dividend. The right-most bit DS0 of the divisor is pre-aligned with this dividend bit DD4, and the quotient bits Q4 and Q7-Q5 respectively corresponding to the predetermined dividend bit DD4 and the dividend bits DD7-DD5 to the left of the predetermined dividend bit DD4 are set equal to zero.

Figure 1:
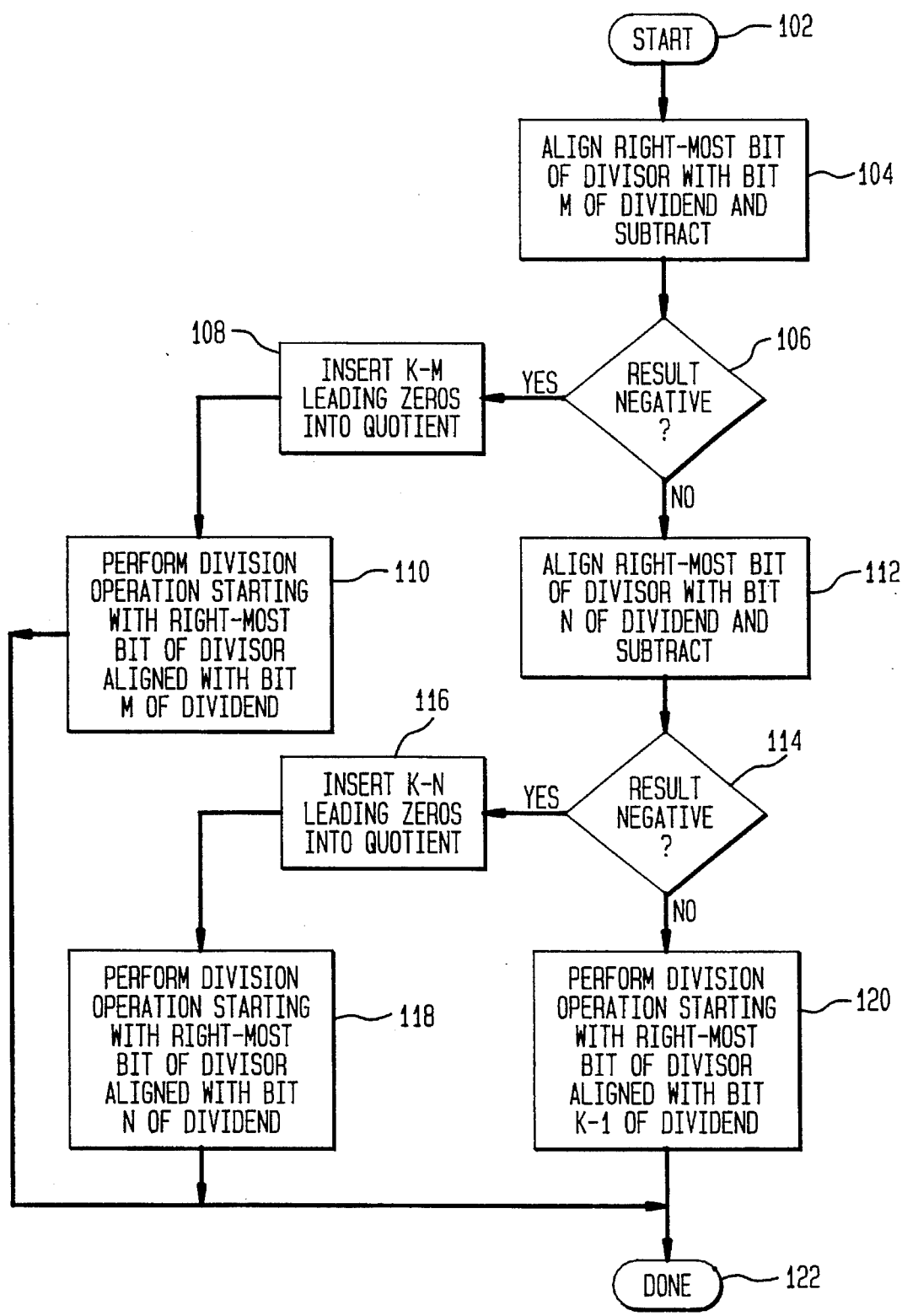
FIG. 1 is a flowchart depicting the operation of an integer divide mechanism according to an embodiment of the present invention.

The third embodiment of the present invention shall now be described in greater detail. FIG. 1 is a flowchart that depicts the operation of the integer divide mechanism according to the third embodiment of the present invention.

Figure 2A:
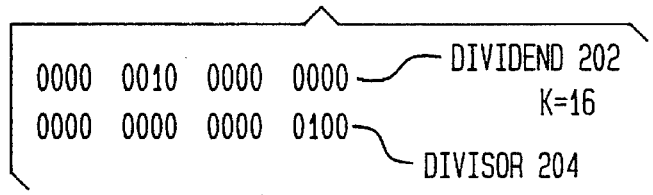
FIGS. 2A–2C depict the processing of an example integer divide operation according to an embodiment of the present invention.

The flowchart of FIG. 1 shall be described with reference to an example integer division operation shown in FIGS. 2A–2C, wherein a 16-bit dividend 202 and a 16-bit divisor 204 are shown (the dividend, the divisor, and the quotient preferably have the same length according to the present invention). The flowchart of FIG. 1 begins with step 102, where control immediately passes to step 104.

In step 104, the right-most bit DS0 of the divisor 204 is aligned with a bit M of the dividend 202 (this dividend bit is called the first predetermined dividend bit). In other words, the divisor 204 is aligned relative to the dividend 202 such that the right-most bit DS0 of the divisor 204 is aligned with the bit M of the dividend 202. M is a predetermined value. In the example of FIGS. 2A–2C, M is equal to 4, such that the right-most bit DS0 of the divisor 204 is aligned with a bit DD4 of the dividend 202 (see FIG. 2B).

Figure 2B:
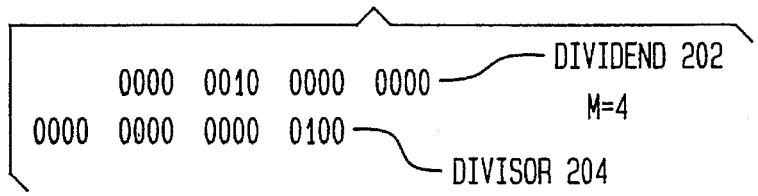
Figure 2C:
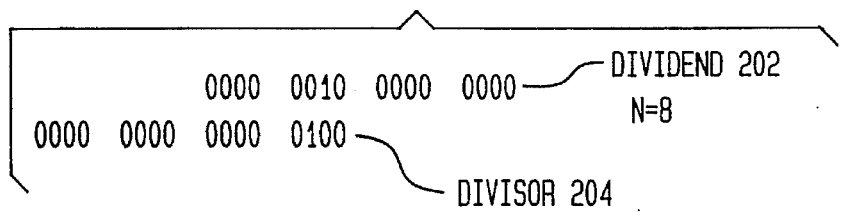

Then in step 104, the divisor 204 is subtracted from an integer value whose right-most bits are equal to the bits of the dividend 202 which are aligned with the divisor 204 (in the example of FIG. 2B, bits DD15-DD4). Thus, in the example of FIG. 2B, 4 is subtracted from 32 to obtain a result of 28.

In step 106, a determination is made as to whether the subtraction operation performed in step 104 results in a negative value. The goal of step 106 is to determine whether the following relationship is true:

$$2^{M} * \text{divisor} > \text{dividend}$$

where "*" represents the multiplication symbol.

If the subtraction operation performed in step 104 does not result in a negative value (i.e., the above relationship is not true), as is the case in the example of FIGS. 2A–2C, then the series of steps beginning with step 112 are performed (described below). If the subtraction operation performed in step 104 does result in a negative value (i.e., the above relationship is true), the series of steps beginning with step 108 are performed.

In step 108, (K–M) leading zeros are inserted into the quotient (the quotient may be maintained in a register, for example), where K is equal to the number of bits in the dividend 202 (or, equivalently, in the divisor 204 or in the quotient). In this manner, the quotient bits corresponding to the first predetermined dividend bit DD4 and the dividend bits DD15-DD5 to the left of the first predetermined dividend bit DD4 are set equal to zero.

Following the completion of step 108, the first step in a conventional integer division procedure (such as that described above with reference to FIGS. 4A–4I, although other well known integer division procedures can be alternatively used) starting with the right-most bit DS0 of the divisor 204 pre-aligned with the first predetermined dividend bit DD4 has been completed (this is the case, since a value has been generated for the quotient bit Q4 corresponding to the first predetermined dividend bit DD4). In step 110, the conventional integer division procedure continues (as described above with reference to FIGS. 4A–4I) such that values for any quotient bits which were not set to zero in step 108 are generated. The division operation remainder is also generated during step 110 in a well known manner. Following the completion of step 110, the integer division operation is complete as indicated by oval 122.

Referring again to step 106, if the subtraction operation performed in step 104 does not result in a negative value, then the series of steps beginning with step 112 are performed.

In step 112, the right-most bit DS0 of the divisor 204 is aligned with a bit N of the dividend 202 (this dividend bit is called the second predetermined dividend bit). N is a predetermined positive integer value. In the example of FIGS. 2A–2C, N is equal to 8, such that the right-most bit DS0 of the divisor 204 is aligned with a bit DD8 of the dividend 202 (see FIG. 2C). Then, the divisor 204 is subtracted from an integer value whose right-most bits are equal to the bits of the dividend 202 which are aligned with the divisor 204 (in this case, bits DD15-DD8). Thus, in the example of FIG. 2B, 4 is subtracted from 2 to obtain a result of −2.

In step 114, a determination is made as to whether the subtraction operation performed in step 112 results in a negative value. If the subtraction operation performed in step 112 does not result in a negative value, then the series of steps beginning with step 120 are performed (described below). Otherwise, the series of steps beginning with step 116 are performed (this is what occurs in the example of FIGS. 2A–2C).

In step 116, (K–N) leading zeros are inserted into the quotient. In this manner, the quotient bits corresponding to the second predetermined dividend bit DD8 and the dividend bits DD15-DD9 to the left of the second predetermined dividend bit DD8 are set equal to zero.

Following the completion of step 116, the first step in a conventional integer division procedure (such as that described above with reference to FIGS. 4A–4I, although other well known integer division procedures can be alternatively used) starting with the right-most bit DS0 of the divisor 204 pre-aligned with the second predetermined dividend bit DD8 has been completed (this is the case, since a value has been generated for the quotient bit Q8 corresponding to the second predetermined dividend bit DD8). In step 118, the conventional integer division procedure continues (as described above with reference to FIGS. 4A–4I) such that values for any quotient bits which were not set to zero in step 116 are generated. The division operation remainder is also generated during step 118 in a well known manner. Following the completion of step 118, the integer division operation is complete as indicated by oval 122.

Referring again to step 114, if the subtraction operation performed in step 112 does not result in a negative value, then the series of steps beginning with step 120 are performed.

In step 120, a conventional integer division procedure (such as that described above, although other well known integer division procedures can be alternatively used) begins starting with the right-most bit DS0 of the divisor 204 aligned with bit (K-1) of the dividend 202 (that is, the left-most dividend bit) to thereby generate values for all of the quotient bits. Note that the quotient is not pre-loaded with any leading zeros, and the divisor 204 is not aligned with any interior bits of the dividend 202. In other words, the conventional integer division procedure occurs without modification. The division operation remainder is also generated during step 110 in a well known manner. Following the completion of step 120, the integer division operation is complete as indicated by oval 122.

According to the third embodiment of the present invention, two attempts are made to optimize the integer divide procedure. The first attempt corresponds to steps 104, 106, 108, and 110, where the right-most bit of the divisor 204 is aligned with bit M of the dividend 202. The second attempt corresponds to steps 112, 114, 116, and 118, where the right-most bit of the divisor 204 is aligned with bit N of the dividend 202. Alternative embodiments of the present invention may include a single attempt at optimizing the integer divide procedure, or may include three or more attempts at optimizing the integer divide procedure. In each succeeding attempt, the bit position of the predetermined dividend bit to which the right-most bit of the divisor is pre-aligned increases in value. The implementation of these alternative embodiments will be apparent to persons skilled in the relevant art.

Preferably, K is equal to 64, M is equal to 16, and N is equal to 32, although other values may be used. The values of K, M, and/or N may be permanently set, or may be adjustable by programmers via appropriate software commands.

Figure 3:
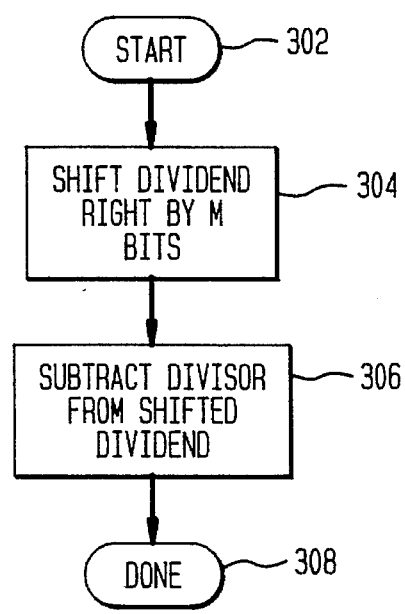
FIG. 3 is a flowchart depicting the operation of an alignment procedure whereby a divisor is aligned relative to a dividend according to an embodiment of the present invention.

FIG. 3 is a flowchart illustrating the operation of step 104 (FIG. 1) in greater detail. The flowchart of FIG. 3 begins with step 302, where control immediately passes to step 304.

In step 304, the dividend is shifted right by M bits, wherein zeros are shifted into the left end bit position of the dividend (this is called a logical right shift).

In step 306, the divisor is subtracted from the right-shifted dividend.

The operation of step 112 is similar to the operation of step 104 as shown in FIG. 3, except that in step 304 "M" is replaced by "N". Other implementations of steps 104 and 112 will be apparent to persons skilled in the relevant art.

Figure 8:
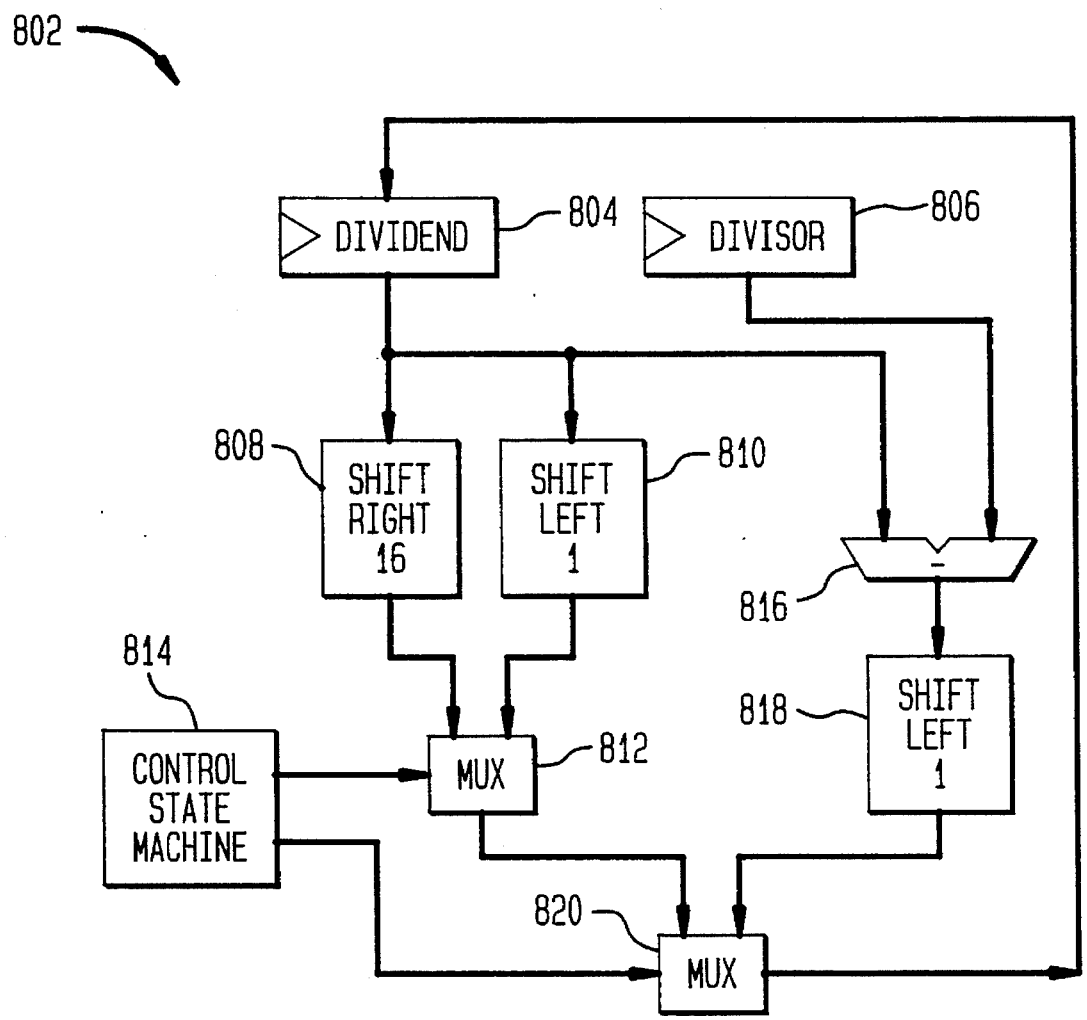
FIG. 8 is a block diagram of an integer divider according to a third embodiment of the present invention.

The third embodiment of the present invention is preferably implemented as shown in FIG. 8, wherein a block diagram of an integer divider 802 is shown. The integer divider 802 includes registers 804 and 806 for storing a dividend and a divisor, respectively.

A control state machine 814 commands a shift right register 808 to logically shift the dividend (in the register 804) right by M bits (M is preferably equal to 16 bits, although other values can alternatively be used). The right shifted dividend is then stored in register 804 via multiplexers 812 and 820 (pursuant to appropriate commands from the control state machine 814). The bits of the dividend which are shifted out of the shift right register 808 are stored in a temporary register (not shown) that is coupled to the shift right register 808 and to a shift left register 810 and a shift left register 818. In the example of FIG. 4K, M equals 4 such that bits "1001" are stored in this temporary register.

The control state machine 814 then commands a subtracter 816 to subtract the divisor (in register 806) from the current value of the dividend (in register 804). The result of this subtraction is communicated to the control state machine 814. If the result of this subtraction is a negative value, then the control state machine 814 sets to zero quotient bits having bit positions equal to and greater than M (these quotient bits are preferably stored in a register, not shown). In the example of FIG. 4K, quotient bits Q7-Q4 are set to zero.

At this point, the divisor has been pre-aligned with the dividend, and the appropriate number of leading zeros have been stored in the quotient (that is, in the register which stores the quotient). A conventional integer divide operation then begins using the components of FIG. 8. This integer divide operation is similar to that described with respect to FIG. 6, and therefore shall not be discussed further.

If, instead, the result of the subtraction operation by the subtracter 816 is a positive value, then the control state machine 814 commands the shift right register 808 to shift the current dividend value (in the register 804) by an additional M bits, such that the original dividend has been right shifted by a total of N bits (where N=M+M). The right shifted dividend is then stored in register 804 via multiplexers 812 and 820 (pursuant to appropriate commands from the control state machine 814). The bits of the dividend which are shifted out of the shift right register 808 are right shifted into the temporary register.

The control state machine 814 then commands the subtracter 816 to subtract the divisor (in register 806) from the current value of the dividend (in register 804). The result of this subtraction is communicated to the control state machine 814. If the result of this subtraction is a negative value, then the control state machine 814 sets to zero quotient bits having bit positions equal to and greater than N (these quotient bits are preferably stored in a register, not shown).

At this point, the divisor has been pre-aligned with the dividend, and the appropriate number of leading zeros have been stored in the quotient (that is, in the register which stores the quotient). A conventional integer divide operation then begins using the components of FIG. 8. As noted above, this integer divide operation is similar to that described with respect to FIG. 6, and therefore shall not be discussed further.

If the result of the second subtraction operation is, instead, a positive value, then the control state machine 814 causes the original dividend value to be re-loaded into the register 804. Then, a conventional integer divide operation then begins using the components of FIG. 8, wherein the right-most bit of the divisor is aligned with the left-most bit of the dividend.

The control state machine 814 in the integer divider 802 of FIG. 8 is preferably implemented as a hardware state machine operating as described above. Alternatively, the control state machine 814 is a processor operating in accordance with computer software. Other aspects of the components shown in FIG. 6 will be apparent to persons skilled in the art.

The integer divide mechanism of the present invention has been so far described with respect to unsigned integer division. Both the first, second, and third embodiments of the present invention can also perform signed integer division with minor modifications.

For example, for all of the embodiments of the present invention, a first circuit is added to generate the absolute value of both the dividend and the divisor prior to the performance of the integer divide algorithms discussed above. A second circuit is also added to adjust the sign of the quotient in accordance with the respective signs of the dividend and the divisor (for example, the sign bit of the quotient is set to indicate a positive value if the dividend and the divisor were both positive values or both negative values prior to the performance of the absolute value operation).

The implementation of the first and second circuits will be apparent to persons skilled in the relevant art. Also, other modifications to the integer divide mechanism of the present invention to accommodate signed integer division will be apparent to persons skilled in the relevant art based on the discussion contained herein.

Generally, the integer divide mechanism of the second embodiment operates faster than the integer divide mechanism of the third embodiment, because: (1) the second embodiment pre-aligns the divisor relative to the dividend at the most advantageous position for division, while the third embodiment pre-aligns the divisor relative to the dividend at arbitrarily selected bit positions; and (2) the second embodiment does not require the iterative performance of shift and subtraction operations to determine the pre-alignment position of the divisor.

However, the integer divide mechanism of the third embodiment generally requires less hardware to implement than the integer divide mechanism of the second embodiment, because unlike the second embodiment: (1) the third embodiment does not require a full right shifter (that is, the third embodiment does not require a right shifter than can shift by 1 to K-1 bits, where K is the length of the divisor); (2) the third embodiment does not require two FFO detectors; and (3) the third embodiment generally requires a less complicated state machine than the second embodiment.

The integer divide mechanism of the first embodiment represents a compromise between the advantages and disadvantages of the second and third embodiments. As will be appreciated, however, these general characterizations may not be true for all implementations of the present invention.

It should be noted that conventional non-restoring divide procedures may be applied during all division steps.

It should also be noted that the embodiments described above represent different procedures and techniques for determining the extent to which the divisor is pre-aligned relative to the dividend prior to commencement of a conventional division operation.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of dividing an integer dividend by an integer divisor to generate an integer quotient, comprising the steps of:

(1) aligning the divisor relative to the dividend such that a right-most bit of the divisor is aligned with a bit M of the dividend, wherein M is an integer value that identifies a bit position of the dividend;

(2) comparing the divisor to an integer value whose right-most bits are equal to bits of the dividend which are aligned with bits of the divisor;

(3) clearing to zero, as a result of said comparison, quotient bits which positionally correspond to the dividend bit M and to bits of the dividend which are located to the left of the dividend bit M; and (4) dividing, as a result of said comparison, the dividend by the divisor as aligned in step (1) to thereby generate values for any uncleared quotient bits.

2. The method of claim 1, wherein step (1) comprises the step of logically right shifting the dividend by M bits.

3. The method of claim 1, wherein step (2) comprises the step of determining whether a value of $2^M$*divisor is greater than the dividend.

4. The method of claim 1, wherein step (2) comprises the steps of:

subtracting the divisor from said integer value to generate a subtraction result; and determining that said divisor is greater than said integer value if said subtraction result is a negative value, wherein steps (3) and (4) are performed if it is determined that said divisor is greater than said integer value.

5. The method of claim 4 in which the dividend and the quotient each has a length of K bits, wherein step (3) comprises the step of inserting (K–M) leading zeros into the quotient if said divisor is greater than said integer value.

6. The method of claim 4, further comprising the following steps which are performed if it is determined that said divisor is not greater than said integer value:

(5) aligning the divisor relative to the dividend such that a right-most bit of the divisor is aligned with a bit N of the dividend, wherein N is an integer value that identifies a bit position of the dividend;

(6) comparing the divisor to a second integer value whose right-most bits are equal to bits of the dividend which are aligned with bits of the divisor as a result of the alignment operation performed in step (5);

(7) clearing to zero, as a result of said comparison of step (6), quotient bits which positionally correspond to the dividend bit N and to bits of the dividend which are located to the left of the dividend bit N; and (8) dividing, as a result of said comparison of step (6), the dividend by the divisor as aligned in step (5) to thereby generate values for any uncleared quotient bits.

7. The method of claim 6 in which the dividend, the divisor, and the quotient each has a length of K bits, wherein K is equal to 64, M is equal to 16, and N is equal to 32.

8. A mechanism for dividing an integer dividend by an integer divisor to generate an integer quotient, comprising:

means for aligning the divisor relative to the dividend such that a right-most bit of the divisor is aligned with a bit M of the dividend, wherein M is an integer value that identifies a bit position of the dividend;

means for comparing the divisor to an integer value whose right-most bits are equal to bits of the dividend which are aligned with bits of the divisor;

means, responsive to said comparing means, for clearing to zero quotient bits which positionally correspond to the dividend bit M and to bits of the dividend which are located to the left of the dividend bit M; and means, responsive to said comparing means, for dividing the dividend by the divisor as aligned by said aligning means to thereby generate values for any uncleared quotient bits.

9. The mechanism of claim 8, wherein said aligning means logically right shifts the dividend by M bits.

10. The mechanism of claim 8, wherein said comparing means determines whether a value of $2^M$*divisor is greater than the dividend.

11. The mechanism of claim 8, wherein said comparing means comprises:

means for subtracting the divisor from said integer value to generate a subtraction result; and means for determining that said divisor is greater than said integer value if said subtraction result is a negative value, wherein said clearing means and said dividing means are responsive to a determination that said divisor is greater than said integer value.

12. The mechanism of claim 11 in which the dividend and the quotient each has a length of K bits, wherein said clearing means inserts (K–M) leading zeros into the quotient if said divisor is greater than said integer value.

13. The mechanism of claim 11, further comprising:

second alignment means, responsive to said first comparing means, for aligning the divisor relative to the dividend such that a right-most bit of the divisor is aligned with a bit N of the dividend, wherein N is an integer value that identifies a bit position of the dividend;

second comparing means for comparing the divisor to a second integer value whose right-most bits are equal to bits of the dividend which are aligned with bits of the divisor as a result of the alignment operation performed by said second alignment means;

second clearing means, responsive to said second comparing means, for clearing to zero quotient bits which positionally correspond to the dividend bit N and to bits of the dividend which are located to the left of the dividend bit N; and second dividing means, responsive to said second comparing means, for dividing the dividend by the divisor as aligned by the second alignment means to thereby generate values for any uncleared quotient bits.

14. The mechanism of claim 13 in which the dividend, the divisor, and the quotient each has a length of K bits, wherein K is equal to 64, M is equal to 16, and N is equal to 32.

15. A method of dividing an integer dividend by an integer divisor to generate an integer quotient, comprising the steps of:

(1) locating a leading non-zero bit in the dividend;

(2) aligning the divisor relative to the dividend such that a right-most bit of the divisor is aligned with said leading dividend bit;

(3) clearing to zero quotient bits which positionally correspond to bits of the dividend which are located to the left of the leading dividend bit; and (4) dividing the dividend by the divisor as aligned in step (2) to thereby generate values for any uncleared quotient bits.

16. A method of dividing an integer dividend by an integer divisor to generate an integer quotient, comprising the steps of:

(1) locating a leading non-zero bit in the dividend and a leading non-zero bit in the divisor;

(2) subtracting a bit position of the leading non-zero divisor bit from a bit position of the leading non-zero dividend bit to thereby generate a pre-alignment bit value;

(3) aligning the divisor relative to the dividend such that a right-most bit of the divisor is aligned with a bit of the dividend having a bit position equal to the pre-alignment bit value;

(4) clearing to zero quotient bits having bit positions equal to or greater than the pre-alignment bit value; and (5) dividing the dividend by the divisor as aligned in step (3) to thereby generate values for any uncleared quotient bits.

* * * * *